(No Model.)  2 Sheets—Sheet 1.

I. WEPPLO.
ROTARY STEAM ENGINE.

No. 602,787. Patented Apr. 19, 1898.

Witnesses
W. W. Hollingsworth
Victor J. Evans

Inventor
Isaac Wepplo
By John Wedderburn.
Attorney (No Model.)  2 Sheets—Sheet 2.

I. WEPPLO.
ROTARY STEAM ENGINE.

No. 602,787.  Patented Apr. 19, 1898.

Witnesses
W. W. Hollingsworth
Victor J. Evans

Inventor
Isaac Wepplo
By John Wedderburn.
Attorney

UNITED STATES PATENT OFFICE.

ISAAC WEPPLO, OF BANDON, MINNESOTA.

ROTARY STEAM-ENGINE.

SPECIFICATION forming part of Letters Patent No. 602,787, dated April 19, 1898.

Application filed May 28, 1897. Serial No. 638,607. (No model.)

*To all whom it may concern:*

Be it known that I, ISAAC WEPPLO, of Bandon, in the county of Renville and State of Minnesota, have invented certain new and useful Improvements in Rotary Steam-Engines; and I do hereby declare the following to be a full, clear, and exact description of the invention, such as will enable others skilled in the art to which it appertains to make and use the same.

This invention relates to rotary steam-engines or motors; and it consists, essentially, of a rotary piston eccentrically mounted in a piston-chamber, and having a series of specifically-formed sliding valves or wings in connection therewith and coacting with each other to combine the impelling power of the steam admitted to the said piston-chamber, and having their outer ends engaging guiding-flanges to provide a continual contact thereof when extended with the interior surface of the piston-chamber, together with a suitable steam-regulating cut-off and reversing mechanism.

The invention further consists of the details of construction and arrangement of the several parts, which will be more fully hereinafter described and claimed.

The object of the present invention is to utilize a given quantity of steam with greater effect and without loss of its impacting or impelling force and before exhaustion, and to overcome any tendency toward dead-center by successively admitting steam and causing it to contact with valves or wings.

Figure 1:
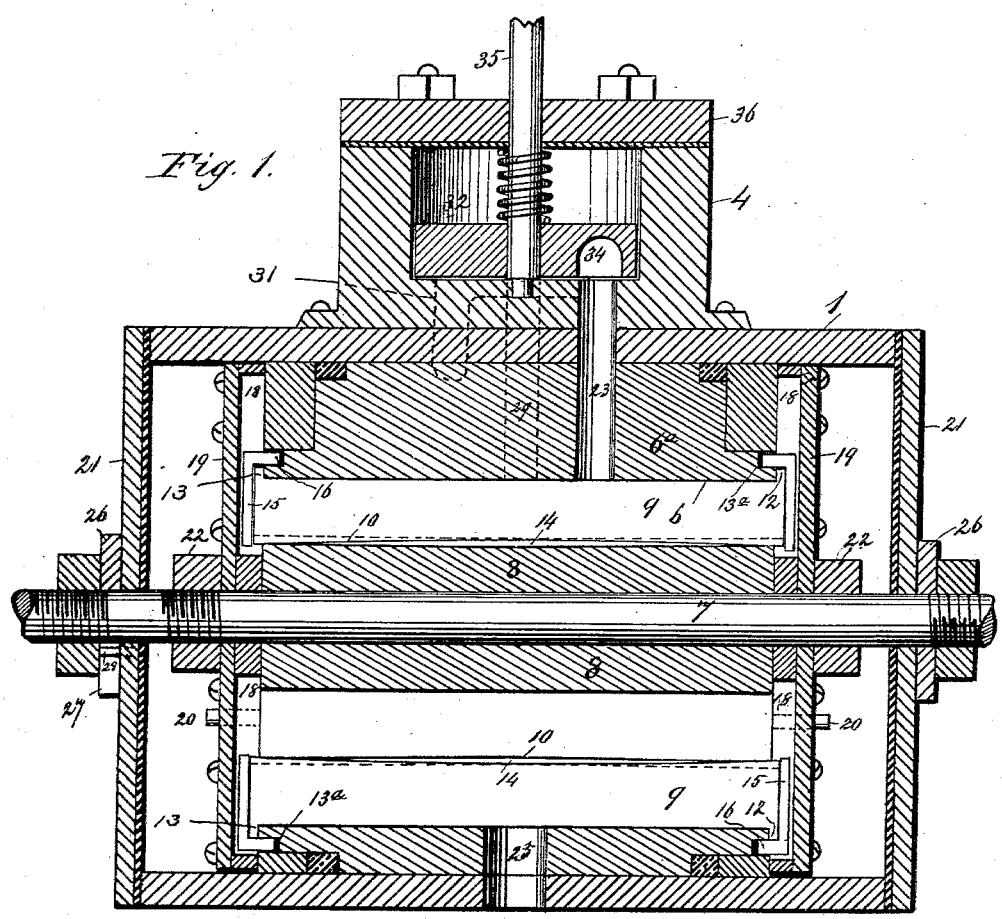
Figure 4:
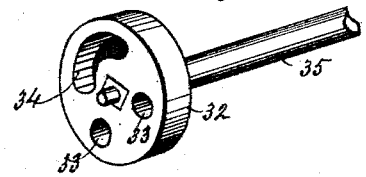
Figure 3:
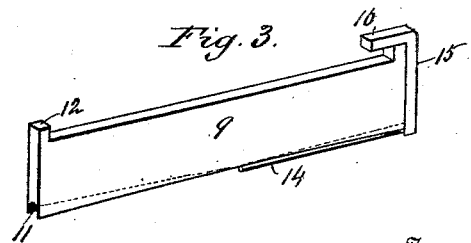
Figure 2:
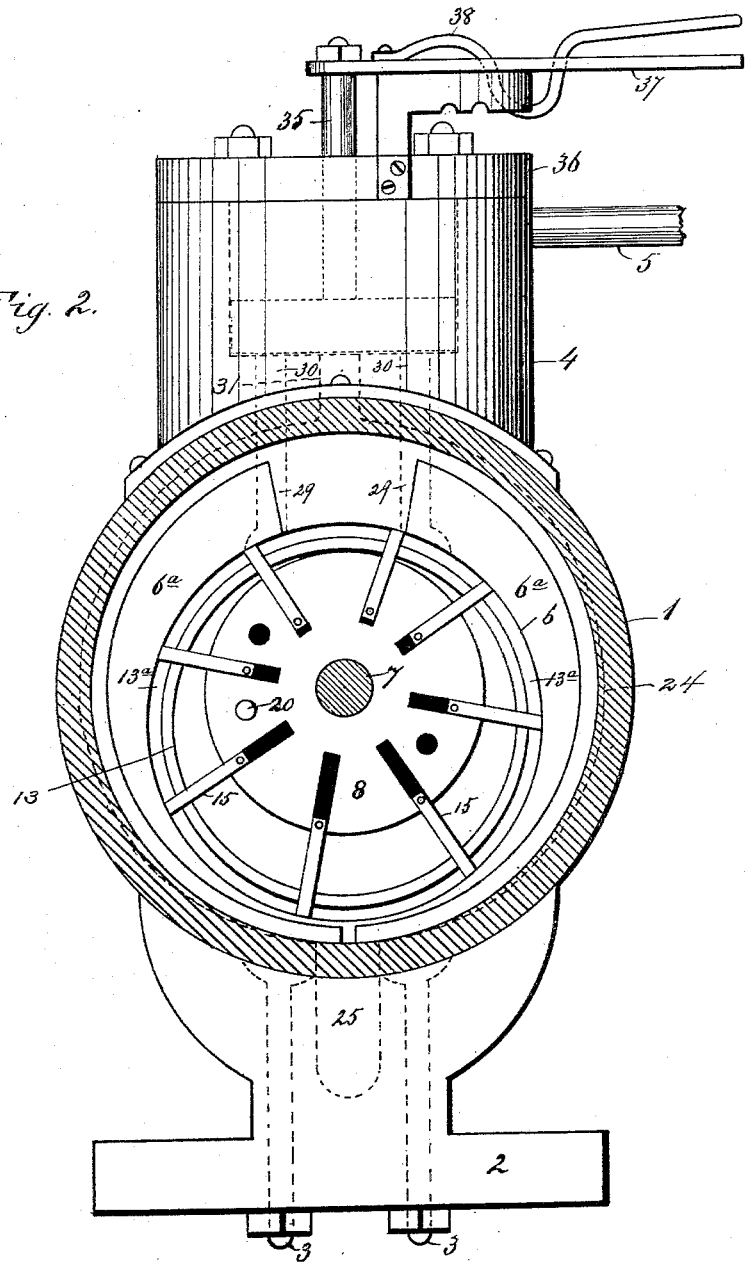
Figure 5:
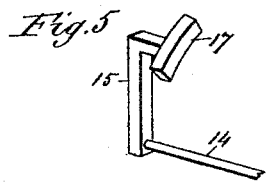

In the accompanying drawings, Figure 1 is a central vertical longitudinal section of a rotary steam-engine or motor embodying the invention. Fig. 2 is a transverse central section of the device. Fig. 3 is a detail perspective view of one of the valves or wings and a part of one of the guide-flanges coacting therewith. Fig. 4 is a detail perspective view of a portion of the cut-off and reversing mechanism. Fig. 5 is a detail perspective view of a modified form of construction.

Referring to the drawings, wherein similar numerals of reference are employed to indicate corresponding parts in the several views, the numeral 1 designates an outer shell or casing supported by a suitable base-rest 2 through the medium of bolts 3. On the upper part of the said shell or casing is mounted a cut-off support 4, providing a steam-receiving chamber having an induction-pipe 5 connected thereto. Within the interior of the shell or casing a circular piston-chamber 6 is formed by an enveloping cylindrical body $6^a$, fixed within the outer shell or casing, and extending eccentrically through the said chamber is a shaft 7, on which is mounted a radially-slotted rotary piston 8, wherein valves or wings 9 are loosely positioned and extend from end to end of the body $6^a$ and longitudinally of the piston. The said valves or wings are preferably of elongated rectangular form and have their inner edges slightly concave, as at 10, thereby projecting the outer ends downwardly, and in said ends are formed longitudinally-disposed short grooves 11. The outer edges of the said valves or wings are straight and have guide-lugs 12 projecting upwardly therefrom, which bear against the outer edges of guide-flanges 13, formed by grooving the outer ends of the body $6^a$, as at $13^a$. The grooves 11 in the inner edges of the said valves or wings have elongated yielding rods 14 seated therein, and to the outer ends of said rods the inner ends of arms 15 are attached and embrace the opposite ends of the said valves or wings. The outer ends of each of the arms is formed with an inner right-angular extension 16, extending into the groove 13 and bearing upon the guide-flange and constructed as set forth. The angular extension 16 of the arms 15 draws the valves or wings outwardly from the piston in view of the eccentric arrangement of the latter in the said piston-chamber, which is circular, and the rods 14 have a yielding tendency to reduce wear on the outer edges of the said valves or wings incident to the frictional bearing of the latter against the wall of the piston-chamber.

In Fig. 5 a slight modification in the construction and arrangement of the parts is shown, and therein the arms 15 have curved shoes 17 attached thereto, which travel in the groove 13 and bear upon the flange formed by the wall of the piston-chamber. Over the opposite ends of the body $6^a$ radially-slotted heads 18 are mounted, through which the arms and the adjacent portions of the valves or wings are adapted to extend, the slots in the said heads being long enough to compensate for the movement of the valves or wings. Over the said heads 18 clamping-plates 19 are mounted and united to the said heads by a suitable number of screws. The heads and clamping-plates rotate with the piston around the shaft 7, and to secure this operation a pin 20 projects outwardly from each end of the said piston and extends through the heads and clamping-plates. Outside of the heads and clamping-plates are applied the opposite end plates 21 of the outer shell or casing 1, and between the same and the clamping-plates 19 nuts 22 are mounted on screw-threaded portions of the shaft to hold the body $6^a$ in proper position in the casing and to cause an alinement of an exhaust-port 23, formed in the lower portion thereof and which extends therearound by means of a channel 24 to always insure communication with a lower exhaust-port 25, constructed in the bottom of the outer shell or casing. To firmly position the opposite ends of the outer casing, retaining-plates 26, having openings therein through which the shaft extends, are brought to bear directly against the said ends and are also formed with lower slots 27, opening outwardly through the bottom edges and passed over diametrically-disposed pins 28, attached to the said heads and passed through the said slots 27 to prevent rotation of the said retaining-plates. After the said retaining-plates are mounted in position nuts are applied to the several parts and suitable packings will be introduced at all points to insure a steam-tight connection.

In the side of the body $6^a$ opposite to that in which the exhaust-port is formed two ports 29 are located and adapted to be used for the admission of steam in operating the piston in either one of two directions. These ports are located under and aline with corresponding ports 30, formed in the bottom of the steam-chamber located on the top of the outer shell or casing. A third opening 31 is also located in said bottom of the steam-chamber and communicates with the channel extending around the body $6^a$ to the exhaust-port in the bottom of the said outer shell or casing. Resting against the bottom of the steam-chamber is a spring-pressed rotary valve 32, having two ports 33 therein, which are adapted to aline with either one of the ports 29 in the body $6^a$, and also having an under exhaust-cavity 34, adapted to span the ports.

It will be understood that one set of ports in the valve and steam-chamber could be arranged to operate the rotary piston in either one of two directions and the cavity exhausts from either one side or the other, in accordance with the movement of the rotary piston. The said cavity is thrown into communication with the channel in the body $6^a$, as stated, through one of the ports in the bottom of the steam-chamber, and by moving the said valve so as to shut off all the ports the engine will be stopped, as will be readily understood. The said valve has an operating-stem 35 projecting upwardly therefrom and through a steam-packed cover-plate 36, and to the upper end thereof is attached an operating-lever 37, having a spring-loop 38 in connection therewith adapted to engage a toothed segment supported on the cut-off or steam-chamber, and by this means the valve can be operated. The notches are so arranged in the segment as to bring the valve into proper position when the lever is turned into engagement therewith.

In operation the steam is permitted to enter the rotary-piston chamber and strike the valves or wings and rotate the piston, successive steam-chambers being formed by the extension of the valves from the rotary piston and the speed of the said piston thereby accelerated as well as dead-center prevented. A new supply of steam is continuously fed to the rotary-piston chamber, and the live steam striking the adjacent valve or wing will impart a new impetus to the rotary piston in addition to the impacting and impelling power of the steam contained between the valves or wings which are moving in advance. This operation continues until the said valves or wings reach the exhaust-ports and the steam is permitted to pass outwardly from the engine or motor.

The device as an entirety is positive in its action and can be applied to any mechanism for driving a shaft or imparting a momentum to other parts.

While steam has been set forth in connection with the engine, it will be understood that air or water can be substituted without rearranging the parts.

Having thus described the invention, what is claimed as new is—

1. In a rotary engine of the character set forth, the combination of an outer shell or casing supported upon a suitable base, an interior shell or casing having a circular piston-chamber formed therein, a shaft extending concentrically through said piston-chamber having a radially-slotted rotary piston thereon, valves or wings movably carried by the said piston and having lugs engaging the opposite ends of the piston-chamber, arms with outer angular ends fitted to the opposite ends of the said valves or wings, the latter being formed slightly concave at their back edges and provided with grooves adjacent to the opposite ends, and yielding rods seated in the back portions of the said valves or wings, and having the said arms connected to opposite ends thereof, substantially as described.

2. In a rotary engine of the character set forth, the combination of a body having a piston-chamber therein, a piston concentrically mounted in said piston-chamber, valves or wings movably carried by the said piston, and having grooves on their inner edges, arms embracing the opposite ends of the valves or wings having inwardly-extending ends standing over the outer portions of the said valves or wings, guides for engaging the inwardly-extending outer ends of the said arms, and radially-slotted end plates in which the said arms have movement, substantially as described.

3. In a rotary engine of the character set forth, the combination of a body having a piston-chamber therein, a rotary piston mounted in said body, valves or wings movably carried by the said piston, arms embracing the opposite ends of the said valves or wings, slotted end plates in which said arms have movement, clamping-plates engaging the said end plates, guides for the said arms and means set forth for controlling the ingress and exhaust of steam, substantially as described.

4. In a rotary engine of the character set forth, the combination of a rotary piston having a series of slots therein, valves or wings movably mounted in said piston, arms embracing the opposite ends of the said valves or wings, slotted end plates in which said arms have movement, and clamping-plates engaging the said end plates, said clamping-plates and end plates being rotatable with the piston, substantially as described.

In testimony whereof I have signed this specification in the presence of two subscribing witnesses.

ISAAC WEPPLO.

Witnesses:
FRANK LAHTI,
CHAS. LAHTI.